(12) United States Patent
Hattori et al.

(10) Patent No.: US 7,108,927 B2
(45) Date of Patent: Sep. 19, 2006

(54) MAGNETIC RECORDING MEDIUM

(75) Inventors: Yasushi Hattori, Kanagawa (JP); Koukichi Waki, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 10/694,839

(22) Filed: Oct. 29, 2003

(65) Prior Publication Data

US 2004/0091747 A1 May 13, 2004

(51) Int. Cl.
*G11B 5/66* (2006.01)
*G11B 5/70* (2006.01)

(52) U.S. Cl. .............................. 428/832.4; 428/840.6; 428/840.5

(58) Field of Classification Search ............... 428/323, 428/336, 694 B, 694, 832.4, 846.2, 847, 428/847.8, 841, 840.6, 840.5
See application file for complete search history.

(56) References Cited

U.S. PATENT DOCUMENTS

| 5,079,096 A | * | 1/1992 | Miyake et al. ............... 428/500 |
| 5,523,153 A | * | 6/1996 | Ushigome ................... 428/323 |
| 5,876,824 A | * | 3/1999 | Noguchi et al. ........... 428/65.3 |
| 6,127,039 A | * | 10/2000 | Saitoh et al. ............ 428/425.9 |
| 6,254,662 B1 | * | 7/2001 | Murray et al. ................. 75/348 |
| 6,602,620 B1 | * | 8/2003 | Kikitsu et al. ........... 428/694 T |

FOREIGN PATENT DOCUMENTS

| JP | 04005212 | * | 1/1992 |
| JP | 2002-157727 A | | 5/2002 |
| WO | WO 98/22942 | | 5/1998 |

OTHER PUBLICATIONS

Derwent Abstract to JP04005212.*
Machine translation of JP 05-189746 (application No. 04-005212), Yanai et al., Jul. 1993.*

* cited by examiner

*Primary Examiner*—Holly Rickman
(74) *Attorney, Agent, or Firm*—Sughrue Mion, PLLC

(57) ABSTRACT

The present invention relates to a magnetic recording medium comprising a magnetic layer on at least one side of a nonmagnetic substrate, the magnetic layer containing magnetic particles of a CuAu type or $Cu_3Au$ type ferromagnetic ordered phase, wherein a conductive layer is provided on at least one side of the nonmagnetic substrate.

15 Claims, No Drawings

US 7,108,927 B2

MAGNETIC RECORDING MEDIUM

CROSS-REFERENCE TO RELATED APPLICATION

This application claims priority under 35 USC 119 from Japanese patent Application No. 2002-315649, the disclosure of which is incorporated by reference herein.

BACKGROUND OF THE INVENTION

1. Field of the Invention

The present invention relates to a magnetic recording medium which has a magnetic layer containing nanoparticles.

2. Description of the Related Art

It is important to reduce the size of magnetic particles contained in a magnetic layer to enhance magnetic recording density. In magnetic recording media which are widely used as video tapes, computer tapes, disks, and the like, when ferromagnetic bodies thereof have the same mass, noise becomes smaller as particle size decreases.

Promising magnetic particle materials for the enhancement of magnetic recording density include CuAu type or $Cu_3Au$ type ferromagnetic ordered alloys. It is known that ferromagnetic ordered alloys have large crystal magnetic anisotropy due to the distortion that occurs at the time of ordering and show ferromagnetism even when the magnetic particle size is reduced (see, for example, Japanese Patent Application Laid-open (JP-A) No. 2002-157727 and the pamphlet of International Publication No. 98/22942).

On the other hand, reducing the magnetic particle size and increasing the recording density of a magnetic recording medium means reducing a minimum recording volume, thereby making the recording medium more susceptible to being affected by dust. A magnetic recording medium has actually been made by applying a FePt nanomagnetic body of the CuAu type onto a Si substrate and annealing the same. As a result, it was discovered that the medium is susceptible to dust adhesion. This is a problem that must be solved in order to put such technology to practical use.

SUMMARY OF THE INVENTION

In view of the above situation, the present invention has as an object thereof to provide a magnetic recording medium which results in less adhesion of dust.

Through intensive studies for solving the aforementioned problem, the present inventors have found that the problem can be solved by the invention described as follows.

The magnetic recording medium of the invention is a magnetic recording medium comprising a magnetic layer on at least one side of a nonmagnetic substrate, the magnetic layer containing magnetic particles of CuAu type or $Cu_3Au$ type ferromagnetic ordered phase, wherein a conductive layer is provided on at least one side of the nonmagnetic substrate.

A first aspect of the invention is to provide a magnetic recording medium (A) comprising a magnetic layer on at least one side of a nonmagnetic substrate, the magnetic layer containing magnetic particles of a CuAu type or $Cu_3Au$ type ferromagnetic ordered phase, wherein a conductive layer is provided on at least one side of the nonmagnetic substrate.

A second aspect of the invention is to provide the magnetic recording medium (A), wherein the conductive layer is disposed between the nonmagnetic substrate and the magnetic layer.

A third aspect of the invention is to provide the magnetic recording medium (A), wherein the conductive layer is disposed on the nonmagnetic substrate on the side opposite to the magnetic layer.

A fourth aspect of the invention is to provide the magnetic recording medium (A), wherein the conductive layer is disposed on an end surface of the nonmagnetic substrate.

A fifth aspect of the invention is to provide the magnetic recording medium (A), wherein the conductive layer contains a conductive metal oxide.

A sixth aspect of the invention is to provide the magnetic recording medium (A), wherein the conductive layer contains the conductive metal oxide, and the conductive metal oxide is selected from ZnO, $TiO_2$, $SnO_2$, $Al_2O_3$, $In_2O_3$, $SiO_2$, MgO, BaO, $MoO_3$, $V_2O_5$ and complex oxides thereof.

A seventh aspect of the invention is to provide the magnetic recording medium (A), wherein the conductive layer contains the conductive metal oxide, and the conductive metal oxide has a volume resistivity of not more than $10^7$ Ωcm.

An eighth aspect of the invention is to provide the magnetic recording medium (A), wherein the conductive layer contains carbon black.

A ninth aspect of the invention is to provide the magnetic recording medium (A), wherein the conductive layer contains the carbon black, and the carbon black has 50 to 500 $m^2/g$ of SBET.

A tenth aspect of the invention is to provide the magnetic recording medium (A), wherein the conductive layer contains the carbon black, and the carbon black has 20 to 400 ml/100 g of DBP oil absorption.

An eleventh aspect of the invention is to provide the magnetic recording medium (A), wherein the conductive layer contains a conductive polymer compound.

A twelfth aspect of the invention is to provide the magnetic recording medium (A), wherein the conductive layer has a thickness of 10 to 700 nm.

A thirteenth aspect of the invention is to provide the magnetic recording medium (A), wherein the magnetic recording medium has a surface electric resistance of not more than $10^{10}$ Ω/sq.

A fourteenth is the magnetic recording medium (A) further comprising either another magnetic layer, a nonmagnetic layer, or a back layer on the side opposite to the magnetic layer.

A fifteenth aspect is the magnetic recording medium (A) further comprising a protection film on the magnetic layer.

DETAILED DESCRIPTION OF THE INVENTION

<<Magnetic Recording Medium>>

The magnetic recording medium of the present invention comprises a magnetic layer on at least one side of a nonmagnetic substrate, the magnetic layer containing magnetic particles of CuAu type or $Cu_3Au$ type ferromagnetic ordered phase, wherein a conductive layer is provided on at least one side of the nonmagnetic substrate. Specifically, the magnetic recording medium can be magnetic tapes such as video tapes and computer tapes; magnetic disks such as floppy (R) disks and hard disks. The magnetic recording medium of the invention will be described in detail below.

<Conductive Layer>

In the magnetic recording medium of the invention, the conductive layer can be provided on at least one side of the nonmagnetic substrate. Preferably, the conductive layer is provided between the nonmagnetic substrate and the magnetic layer, because if the conductive layer is provided on the magnetic layer, increased distance between the magnetic layer and the head causes spacing loss and decreases the output. In the case where the magnetic layer is provided on one side only, the conductive layer can be provided either on the same side as the magnetic layer or on the side opposite to the magnetic layer. If the magnetic layer is subjected to annealing, the conductive layer is preferably provided on the side opposite to the magnetic layer since the conductive layer can be provided after the annealing of the magnetic layer in that case; therefore, in such a case, it is unnecessary to take the heat resistance into consideration, and the range of the selection of the material is broadened. The conductive liiyer may also be provided on the edge of the nonmagnetic substrate.

The conductive material used for the conductive layer can be a conductive metal oxide, a carbon black, or a conductive polymer compound. Conductive metal oxides used for the invention are preferably crystalline metal oxide particles. Crystalline metal oxide particles with high conductivity such as metal oxide particles having lattice defect on oxygen position and metal oxide particles containing small amount of hetero atoms which form a donor for the metal oxide, are particularly preferable. Such metal oxides include ZnO, $TiO_2$, $SnO_2$, $Al_2O_3$, $In_2O_3$, $SiO_2$, MgO, BaO, $MoO_3$, $V_2O_5$, and complex oxides thereof, and most preferable metal oxides are ZnO, $TiO_2$, and $SnO_2$. As the metal oxide particles containing hetero atoms, it is effective to add Al, In, or the like to ZnO, to add Sb, Nb, halogen element, or the like to $SnO_2$, and to add Nb, Ta, or the like to $TiO_2$. The amount of these hetero atoms added is preferably in the range of 0.01 to 30% by mole, and particularly preferably in the range of 0.1 to 10% by mole.

The metal oxide fine particles have conductivity. The metal oxide fine particles have a volume resistivity preferably not more than $10^7$ Ωcm, and more preferably from 1 Ωcm to $10^5$ Ωcm. These oxides are disclosed in JP-A Nos. 56-143431, 56-120519, 58-62647, and others. In addition, as disclosed in Japanese Patent Publication (JP-B) No. 59-6235, it is also possible to use conductive materials in which the above metal oxides are deposited on other crystalline metal oxide particles or fabric materials (e.g. titanium oxide). The particle size usable is preferably not more than 10 μm. A particle size not more than 2 μm is more preferable because particles having such particle sizes are stable after dispersion and easy to use. It is particularly preferable to use conductive particles having particle sizes of 0.01 μm to 0.5 μm. By using conductive particles having particle sizes of 0.01 μm to 0.5 μm, scattering of lights is reduced to minimum and it becomes possible to form a transparent photosensitive material. In the case where the conductive material is acicular or fibrous, it is preferable that a length of the conductive material is not more than 30 μm and a diameter of the conductive material is not more than 2 μm. And it is particularly preferable that the length is not more than 25 μm, the diameter is from 0.01 μm to 0.5 μm, and the length/diameter ratio is from 3 to 10.

The carbon black normally has SBET of 50 to 500 $m^2/g$ and preferably has SBET of 70 to 400 $m^2/g$. The carbon black normally has DBP oil absorption of 20 to 400 ml/100 g, and preferably has DBP oil absorption of 30 to 400 ml/100 g. The carbon black normally has a particle diameter of 5 to 80 nm, preferably 10 to 50 nm, and more preferably 10 to 40 nm. The carbon black preferably has a pH of 2 to 10, a water content of 0.1 to 10%, and a tap density of 0.1 to 1 g/ml. The specific examples of carbon black used in the invention include: BLACKPEARLS 2000, 1300, 1000, 900, 800, 880, and 700, and VULCAN XC-72 manufactured by Cabot Corporation; #3050B, #3150B, #3750B, #3950B, #950, #650B, #970B, #850B, MA-600, MA-230, #4000, and #4010 manufactured by Mitsubishi Chemical Corporation; CONDUCTEX SC, RAVEN 8800, 8000, 7000, 5750, 5250, 3500, 2100, 2000, 1800, 1500, 1255, and 1250 manufactured by Colombian Chemicals Company; and KETJEN-BLACK EC from AKZO NOBEL. The carbon black can be used after being subjected to a surface treatment with a dispersant, or grafted with a resin. Carbon black in which a portion on the surface thereof has been graphitized can also be used. It is also possible to disperse carbon black with a binder before it is added to the paint. These carbon blacks can be used in the range not exceeding 50% by mass with respect to the mass of the above-mentioned inorganic powder and in the range not exceeding 40% with respect to the total mass of the nonmagnetic layer. Also, these carbon blacks can be used singly or in combination. Carbon blacks which can be used in the invention may be selected from, e.g., *Carbon Black Binran* (Carbon Black Handbook) published by *Carbon Black Kyokai* (Carbon Black Association).

The conductive polymer compounds which can be used in the invention include: a polyvinyl benzene sulfonate group; polyvinyl benzil trimethyl ammonium chloride; a quaternary salts polymers disclosed in U.S. Pat. Nos. 4,108,802, 4,118,231, 4,126,467, and 4,137,217; and polymer latexes disclosed in U.S. Pat. No. 4,070,189, OLS No. 2,830,767, and JP-A No. 61-296352 and No. 61-62033.

The thickness of the conductive layer is preferably 10 to 700 nm, more preferably 20 to 400 nm, and further preferably 30 to 100 nm.

The surface electric resistance of the magnetic recording medium is preferably not more than $10^{10}$ Ω/sq, and more preferably not more than $10^9$ Ω/sq.

<Magnetic Layer>

The magnetic layer contains magnetic particles, which are produced by the following method.

The method for producing magnetic particles includes: an alloy particle production process for producing alloy particles which can form a ferromagnetic ordered alloy phase by a liquid phase method or a vapor phase method; an oxidation treatment process for applying an oxidation treatment to the produced alloy particles; and an annealing treatment process for applying an annealing treatment to the alloy particles in an non-oxidizing atmosphere after the oxidation treatment.

In the following, the respective processes, the method for producing the magnetic particles, and the magnetic particles are explained.

<Process for Producing Alloy Particles>

The alloy particles which will be converted to magnetic particles by an annealing treatment can be produced by a vapor phase method or a liquid phase method. In terms of excellent suitability to mass production, the liquid phase method is more preferable. Various well-known liquid phase methods can be employed. Reducing methods, which are improvements of the well-known methods, are preferable. Above all, reverse micelle method is particularly preferable because particle sizes can be easily controlled by the method.

(Reverse Micelle Method)

The reverse micelle method is at least composed of: (1) a reducing process of proceeding a reducing reaction by mixing two kinds of reverse micelle solutions, and (2) an aging process of aging the solutions at a predetermined temperature after the reducing reaction. Each process is explained below.

(1) Reducing Process:

First, a reverse micelle solution (I) is prepared by mixing a water-insoluble organic solvent containing a surfactant and an aqueous solution of a reducing agent.

As the surfactant, an oil-soluble surfactant can be used. Specifically, the surfactant can be a sulfonate type (e.g. Aerosol OT from Wako Pure Chemical Industries, Ltd.), a quaternary ammonium salts type (e.g. cetyltrimethyl ammonium bromide), an ether type (e.g. pentaethylene-glycol dodecylether), or the like.

The content of the surfactant in the water-insoluble organic solvent is preferably 20 to 200 g/liter.

Preferable water-insoluble organic solvents for dissolving the surfactant include alkane, ether, and alcohol.

Preferable alkanes are alkanes each having 7 to 12 carbon atoms. Specifically, heptane, octane, isooctane, nonane, decane, undecane, dodecane, and the like are preferable.

Preferable ethers include diethyl ether, dipropyl ether, and dibutyl ether.

Preferable alcohols include ethoxy ethanol, and ethoxy propanol.

As the reducing agent used in the aqueous solution of reducing agent, it is preferable to use an alcohol; a polyalcohol; $H_2$; a compound containing HCHO, $S_2O_6^{2-}$, $H_2PO_2^-$, $BH_4^-$, $N_2H_5^+$, $H_2PO_3^-$; or the like, singly or in combination of plural kinds of them.

The content of the reducing agent in the aqueous solution is preferably 3 to 50 mol per 1 mol of metal salt.

Here, it is preferable to make the mass ratio (water/surfactant) between the water and the surfactant in the reverse micelle solution (I) not more than 20. When the mass ratio exceeds 20, precipitation is likely to occur and particles are likely to have uneven sizes. The mass ratio is preferably not more than 15, and is more preferably 0.5 to 10.

Another reverse micelle solution (II) is prepared by mixing a water-insoluble organic solvent containing a surfactant and an aqueous solution of metal salt.

The conditions (such as the materials to be used and the concentrations) of the surfactant and the water-insoluble organic solvent are the same as in the case of the reverse micelle solution (I).

It is possible to use the same materials as in the case of the reverse micelle solution (I), or the materials different from those in the case of the reverse micelle solution (I). The mass ratio between the water and the surfactant in the reverse micelle solution (II) is in the same range recited in the case of the reverse micelle solution (I), and can be the same as or different from the ratio in the reverse micelle solution (I).

The metal salt contained in the aqueous solution of metal salt can be appropriately selected so that the magnetic particles to be produced can form a CuAu type or $Cu_3Au$ type ferromagnetic ordered alloy.

The CuAu type ferromagnetic ordered alloy can be FeNi, FePd, FePt, CoPt, CoAu, or the like, and is preferably FePd, FePt, or CoPt.

The $Cu_3Au$ type ferromagnetic ordered alloy can be $Ni_3Fe$, $FePd_3$, $Fe_3Pt$, $FePt_3$, $CoPt_3$, $Ni_3Pt$, $CrPt_3$, or $Ni_3Mn$, and is preferably $FePd_3$, $FePt_3$, $CoPt_3$, $Fe_3Pd$, $Fe_3Pt$, or $Co_3Pt$.

Specific examples of the metal salt include: $H_2PtCl_6$, $K_2PtCl_4$, $Pt(CH_3COCHCOCH_3)_2$, $Na_2PdCl_4$, $Pd(OCOCH_3)_2$, $PdCl_2$, $Pd(CH_3COCHCOCH_3)_2$, $HAuCl_4$, $Fe_2(SO_4)_3$, $Fe(NO_3)_3$, $(NH_4)_3Fe(C_2O_4)_3$, $Fe(CH_3COCHCOCH_3)_3$, $NiSO_4$, $CoCl_2$, and $Co(OCOCH_3)_2$.

The concentration of the aqueous solution of metal salt (in terms of the concentration of metal salt) is preferably 0.1 to 1000 μmol/ml, and more preferably 1 to 100 μmol/ml.

By appropriately selecting the metal salt, alloy particles which can form a CuAu type or $Cu_3Au$ type ferromagnetic ordered alloy composed of a base metal and a noble metal, can be formed.

The alloy phase of the alloy particles must be transformed from a disordered phase to an ordered phase by applying an annealing treatment which will be described later. And it is preferable to add a ternary element such as Sb, Pb, Bi, Cu, Ag, Zn, or In to the binary alloy in order to decrease the transformation temperature. It is preferable that the precursors of these ternary element are added in advance to the aqueous solution of metal salt. The amount of the ternary element added is preferably from 1 to 30 at %, and more preferably from 5 to 20 at % with respect to the binary alloy.

The reverse micelle solutions (I) and (II) thus prepared are mixed with each other. Although the mixing method is not particularly restricted, it is preferable to add the reverse micelle solution (II) to the reverse micelle solution (I) while the reverse micelle solution (I) is stirred from the viewpoint of uniform reduction. After the completion of the mixing, the reducing reaction is proceeded. During the reduction reaction, the temperature is preferably kept at a constant temperature in the range of −5 to 30° C.

When the reduction temperature is less than −5° C., a water phase may freeze, causing uneven reducing reaction. Whereas when the reduction temperature is over 30° C., aggregation or precipitation is likely to occur, and makes the system unstable. Hence the reduction temperature is preferably 0 to 25° C. and more preferably 5 to 25° C.

The term "constant temperature" here indicates that supposing a target temperature is T(° C.), the actual temperature is in the range of T±3° C. Even in this case, the upper and lower limits of the actual temperature are in the aforementioned range of the reduction temperature (−5 to 30° C.).

The duration of the reducing reaction must be appropriately set in accordance with the amount of the reverse micelle solutions and other conditions. The duration is preferably 1 to 30 minutes, and more preferably 5 to 20 minutes.

The reducing reaction greatly affects the monodispersity of the particle distribution. Therefore, it is preferable to carry out the reduction reaction while the solution is stirred at a speed as high as possible.

The stirring device is preferably a device having a high shearing force. More specifically, the stirring blades basically have a turbine or paddle type structure, and sharp edges are attached at the blade edges or at the positions which come in contact with the blades, wherein the blades are rotated by a motor. Specific usable devices include a Dissolver (manufactured by Tokushu Kika Kogyo Co., Ltd.), an Omnimixer (manufactured by Yamato Scientific Co., Ltd.), and a Homogenizer (manufactured by SMT Co., Ltd.). Using these devices makes it possible to produce monodispersed alloy particles as a stable dispersant solution.

It is preferable to add at least one kind of dispersant containing 1 to 3 amino groups or carboxy groups to at least one of the reverse micelle solutions (I) and (II) in an amount of 0.001 to 10 mol per 1 mol of the alloy particles to be produced.

By adding such a dispersant, alloy particles which have higher monodispersity and which do not cause aggregation, can be obtained.

When the amount of the dispersant added is less than 0.001 mol, the monodispersity of the alloy particles may not be sufficiently improved, and when it is over 10 mol, aggregation may occur.

As the dispersant, it is preferable to use an organic compound having a group which is absorbed on the surfaces of the alloy particles. More specifically, such organic compounds have 1 to 3 amino groups, carboxy groups, sulfonic acid groups, or sulfinic acid groups. These organic compounds can be used singly or in combination.

These compounds have the following structural formulas: $R-NH_2$, $NH_2-R-NH_2$, $NH_2-R(NH_2)-NH_2$, $R-COOH$, $COOH-R-COOH$, $COOH-R(COOH)-COOH$, $R-SO_3H$, $SO_3H-R-SO_3H$, $SO_3H-R(SO_3H)-SO_3H$, $R-SO_2H$, $SO_2H-R-SO_2H$, and $SO_2H-R-(SO_2H)-SO_2H$, wherein R represents linear, branched, or cyclic hydrocarbons which are saturated or unsaturated.

The compound particularly preferable as the dispersant is oleic acid. Oleic acid is a well-known surfactant for the stabilization of colloid, and has been used to protect metallic particles such as iron. The comparatively long chain of the oleic acid (e.g., oleic acid has 18 carbon chains and a length up to 20 angstroms (up to 2 nm). Oleic acid is not aliphatic and has one double bond) provides an important steric hindrance to counteract the strong magnetic interaction between particles.

Similar long-chain carbon acids such as erucic acid or linoleic acid can be used in the same manner as oleic acid (for example, long-chain organic acids having 8 to 22 carbon atoms can be used singly or in combination). Oleic acid is preferable because it is a natural source (olive oil and the like) easily available and inexpensive. In addition, oleylamine derived from oleic acid is a dispersant as useful as oleic acid.

In the aforementioned reducing process, it is considered that a metal having a lower standard redox potential (not more than about −0.2 V (vs. N.H.E)) such as Co, Fe, Ni, or Cr in the CuAu type or $Cu_3Au$ type ferromagnetic ordered alloy phase is reduced and very fine particles having a monodispersed distribution are precipitated. Later, in temperature raising stage and the aging process which will be described later, on the surface of the precipitated base metal, which works as the core, metal having a higher standard redox potential (not less than about −0.2 V (vs. N.H.E)) such as Pt, Pd, or Rh is reduced by the base metal, and precipitated by displacing the base metal. It is thought that the ionized base metal is reduced again by the reducing agent and precipitated. This repetition provides alloy particles which can form a CuAu type or $Cu_3Au$ type ferromagnetic ordered alloy.

(2) Aging Process

After the completion of the reducing reaction, the reacted solution is heated up to an aging temperature.

The aging temperature is preferably kept at a constant temperature which is a temperature in the range of 30 to 90° C. and higher than the temperature during the reducing reaction. The duration of aging is preferably 5 to 180 minutes. When the temperature is higher than the range and the duration of the aging are longer than the range, aggregation or precipitation is likely to occur. When the temperature is lower than the range and the duration of the aging is shorter than the range, the reaction may be incomplete and the composition may be changed. The temperature and the duration of the aging are preferably 40 to 80° C. and 10 to 150 minutes, respectively, and more preferably 40 to 70° C. and 20 to 120 minutes, respectively.

The aforementioned term "constant temperature" has the same meaning as in the case of the reducing reaction (except that in this case "reduction temperature" corresponds to "aging temperature"). And it is preferable that the temperature is in the range of the aging temperature (30 to 90° C.) and is higher than the temperature of the reducing reaction by at least 5° C., and more preferably by at least 10° C. When the difference in the temperatures is less than 5° C., the prescribed composition can not be obtained in some cases.

In the aforementioned aging process, the noble metal precipitates on the base metal which has been reduced and precipitated in the reducing process.

Specifically, the reduction of the noble metal occurs only on the base metal, and the precipitation of the base metal and the noble metal does not occur separately. For this reason, it becomes possible to produce alloy particles that can form a CuAu type or $Cu_3Au$ type ferromagnetic ordered alloy having a prescribed composition ratio at high yield, thereby controlling the composition of the particles in a desired composition. In addition, the appropriate adjustment of the temperature and the stirring speed in the aging process enables the obtained alloy particles to have the desired particle diameter.

After the aging, it is preferable to provide a cleaning and dispersing process in which the solution which has been subjected to the aging is cleaned with a mixture solution of water and primary alcohol; precipitating treatment with primary alcohol is applied so as to generate precipitates; and the precipitates are dispersed by an organic solvent.

The cleaning and dispersing process can remove impurities to improve the coating properties in providing the magnetic layer of the magnetic recording medium by coating.

The aforementioned cleaning and dispersing are carried out at least one time for each, and preferably twice or more for each.

Although the primary alcohol used in the cleaning process is not particularly limited, the primary alcohol is preferably methanol, ethanol, or the like. The volume mixture ratio (water/primary alcohol) is preferably in the range of 10/1 to 2/1, and more preferably in the range of 5/1 to 3/1.

When the proportion of water is high, removal of the surfactant becomes difficult in some cases, whereas when the proportion of the primary alcohol is high, aggregation occurs in some cases.

In this manner, alloy particles dispersed in a solution (an alloy particle containing solution) is obtained.

The alloy particles, which have monodispersed size distribution, can remain in uniformly dispersed state without aggregation when applied on a substrate. Therefore, when subjected to an annealing treatment, the alloy particles can be efficiently ferromagnetized without aggregation. Thus, the alloy particles have excellent coating properties.

The alloy particles before the oxidation treatment which will be described later preferably have small diameters from the viewpoint of noise reduction. However, if the diameters of the alloy particles are too small, the alloy particles will have superparamagnetism after the annealing treatment, and will be unsuitable for magnetic recording. In general, the particle diameter is preferably 1 to 100 nm, more preferably 1 to 20 nm, and further preferably 3 to 10 nm.

(Reducing Method)

Although various processes are available for producing alloy particles which can form a CuAu type or $Cu_3Au$ type ferromagnetic ordered alloy by employing a reducing method, methods at least including reducing a metal having a lower standard redox potential (hereinafter sometimes referred to merely as a base metal) and a metal having a higher standard redox potential (hereinafter sometimes referred to merely as a noble metal) in an organic solvent, water, or a mixture of the organic solvent and water by using a reducing agent or the like.

The sequence of reduction of the base metal and the noble metal is not particularly restricted, and the base metal and the noble metal can be reduced simultaneously.

The organic solvent can be alcohol, polyalcohol, or the like. The alcohol can be methanol, ethanol, butanol, or the like. The polyalcohol can be ethylene glycol, glycerin, or the like.

The examples of the CuAu type or $Cu_3Au$ type ferromagnetic ordered alloy are the same as in the case of the aforementioned reverse micelle method.

As a method for preparing alloy particles by precipitating a noble metal first, the method disclosed in the columns 18 to 30 in JP-A No. 2003-073705 can be applied.

The metal having a higher standard redox potential is preferably Pt, Pd, Rh, or the like, and it is possible to use $H_2PtCl_6.6H_2O$, $Pt(CH_3COCHCOCH_3)_2$, $RhCl_3.3H_2O$, $Pd(OCOCH_3)_2$, $PdCl_2$, $Pd(CH_3COCHCOCH_3)_2$, or the like by dissolving the metal in a solvent. The concentration of the metal in the solution is preferably 0.1 to 1000 µmol/ml, and more preferably 0.1 to 100 µmol/ml.

The metal having a lower standard redox potential is preferably Co, Fe, Ni, or Cr, and most preferably Fe or Co. $FeSO_4.7H_2O$, $NiSO_4.7H_2O$, $CoCl_2.6H_2O$, $Co(OCOCH_3)_2.4H_2O$, or the like can be used for providing the metal by being dissolved in a solvent. The concentration of the metal in the solution is preferably 0.1 to 1000 µmol/ml, and more preferably 0.1 to 100 µmol/ml.

It is preferable to decrease the transformation temperature to the ferromagnetic ordered alloy by adding a ternary element to the binary alloy in the same manner as in the aforementioned reverse micelle method. The amount of the ternary element added is the same as in the reversed micelle method.

In the case where the base metal and the noble metal are reduced and precipitated in this order by using a reducing agent, it is preferable to employ a method in which the base metal or a mixture of the base metal and part of the noble metal is reduced by using a reducing agent having a redox potential lower than –0.2 V (vs. N.H.E), the reduced metal is added to the noble metal source, the metal is again reduced by using a reducing agent having a redox potential higher than –0.2 V (vs. N.H.E); then the metal is further reduced by using a reducing agent having a redox potential lower than –0.2 V (vs. N.H.E).

Although the redox potential depends on the pH of the system, as the reducing agent having a redox potential higher than –0.2 V (vs. N.H.E), an alcohol such as 1,2-hexadecandiol, a glycerin group, $H_2$, or HCHO is preferably used.

As the reducing agent having a redox potential lower than –0.2 V (vs. N.H.E), $S_2O_6^{2-}$, $H_2PO_2^-$, $BH_4^-$, $N_2H_5^+$, or $H_2PO_3^-$ is preferably used.

In the case where a O-valent metallic compound such as Fe carbonyl or the like is used as the source of the base metal, reducing agents are not particularly required.

When a noble metal is reduced and precipitated, alloy particles can be stably prepared by using an absorbent. The absorbent is preferably a polymer or a surfactant.

The polymer can be polyvinyl alcohol (PVA), poly N-vinyl-2 pyrrolidone (PVP), gelatin, or the like. Above all, PVP is particularly preferable.

The molecular weight is preferably 20,000 to 60,000, and more preferably 30,000 to 50,000. The amount of the polymer is preferably 0.1 to 10 times the mass of the alloy particles to be produced, and more preferably 0.1 to 5 times the mass of the alloy particles to be produced.

The surfactant preferably used as the absorbent preferably contains an "organic stabilizer", which is a long-chain organic compound represented by a general formula: R—X. R in the general formula represents "tail group" which is a linear or branched, hydrocarbon or fluorocarbon chain, and usually contains 8 to 22 carbon atoms. On the other hand, X in the general formula represents "head group" which is a portion (X) that provides a specific chemical bond on the surfaces of the alloy particles, and is preferably sulfinate (—SOOH), sulfonate (—$SO_2OH$), phosphinate (—POOH), phosphonate (—$OPO(OH)_2$), carboxylate, or thiol.

The aforementioned organic stabilizer is preferably sulfonic acid (R—$SO_2OH$), sulfinic acid (R—SOOH), phosphinic acid ($R_2POOH$), phosphonic acid (R—$OPO(OH)_2$), carbonic acid (R—COOH), thiol (R—SH), or the like. Above all, oleic acid is particularly preferable as in the reverse micelle method.

The combination (triorganophosphine/acid or the like) of phosphine and the organic stabilizer can effectively control the growth and stabilization of particles. As the solvent it is possible to use didecyl ether or didodecyl ether; and, phenyl ether and n-octylether are also preferable because of their low prices and high boiling points.

The reaction is preferably carried out in a temperature range of 80 to 360° C. depending on the boiling points of the necessary alloy particles and solvent, and more preferably in a temperature range of 80 to 240° C. At a temperature lower than this temperature range, the particles do not grow in some cases. At a temperature higher than this temperature range, in some cases, the particles grow uncontrollably, and the generation of undesired by-products increases.

As in the reverse micelle method, the diameter of the alloy particles is preferably 1 to 100 nm, more preferably 3 to 20 nm, and most preferably 3 to 10 nm.

As a method for increasing the particle size (particle diameter), seed crystal method is effective. When used as a magnetic recording medium, the alloy particles are preferably packed closest so as to increase the recording capacity. To realize a closest packing, the standard deviation of the alloy particle size is preferably less than 10%, and more preferably not more than 5%.

Too small a particle size is not preferable because it makes the particles superparamagnetic. Therefore, the seed crystal is preferably used as mentioned above to increase the particle size. With the seed crystal, there are cases where a metal having a standard redox potential higher than the standard redox potentials of the metals composing the particles is precipitated. In that case, it is preferable to subject the particles to a hydrogenation process in advance for preventing the oxidization of the particles.

The outermost layer of the alloy particles is preferably composed of a noble metal from the viewpoint of preventing oxidation; however, a noble metal is likely to aggregate, therefore a mixture alloy of a noble metal and a base metal is preferably used according to the invention. This structure can be realized easily and efficiently by the aforementioned liquid phase method.

Removing salts from the solution after the synthesis of the alloy particles is preferable in order to improve the dispersion stability of the alloy particles. Desalting can be proceeded by adding alcohol in excess amounts to cause slight aggregation, allowing the aggregate to sediment naturally or centrifugally sedimenting the aggreagete, then removing the salts together with the supernatant. However, this method is likely to cause aggregation. Hence, it is preferable to employ ultrafiltration.

In this manner, alloy particles dispersed in a solution (an alloy particle containing solution) can be obtained.

For the evaluation of the diameter of the alloy particles, a transmission electron microscope (TEM) can be used. The crystal system of the alloy particles or the magnetic particles can be determined by electronic diffraction with a TEM; however, X-ray diffraction is more preferable because of its higher precision. The composition analysis inside of the alloy particles or the magnetic particles is preferably conducted by using an FE-TEM with an EDAX which can narrow electron beams. The magnetic properties of the alloy particles or the magnetic particles can be evaluated by using a VSM.

<Oxidation Treatment Process>

By applying an oxidation treatment to the produced alloy particles, magnetic particles having ferromagnetism can be produced efficiently without increasing the temperature of the subsequent annealing treatment in a nonoxidizing atmosphere. This is considered to result from the following phenomenon.

First, the alloy particles are oxidized, and oxygen penetrates into the crystal lattice. When an annealing treatment is proceeded while oxygen is inside the crystal lattice, the oxygen leaves the crystal lattice by the heat. This elimination of the oxygen causes defects in the crystal, through which the metal atoms composing the alloy migrate more easily. It is considered that for this reason, phase transformation becomes more likely to occur even at comparatively low temperatures.

This phenomenon can be supported by EXAFS (Extended X-ray Absorption Fine Structure) measurement of the alloy particles which have been subjected to the oxidation treatment and the magnetic particles which have been subjected to the annealing treatment.

For example, in Fe—Pt alloy particles which have not been subjected to an oxidation treatment, the presence of bonds between Pt atoms and Fe atoms or bonds among Fe atoms can be observed.

In contrast, in the alloy particles that have been subjected to the oxidation treatment, the presence of the bonds between Fe atoms and oxygen atoms can be observed; however, the bonds between Pt atoms and Fe atoms and bonds among Fe atoms are hardly observed. This indicates that oxygen atoms cut the Fe—Pt bonds and the Fe—Fe bonds. It is considered that this bond cleavage facilitates movement of Pt atoms and Fe atoms at the time of annealing.

After the alloy particles are subjected to the annealing treatment, the presence of oxygen cannot be observed, and the bonds between Pt atoms and Fe atoms and bonds among Fe atoms can be confirmed.

Considering this phenomenon, it can be understood that phase transformation does not proceed easily and a high annealing treatment temperature is required if oxidation treatment is not conducted. However, if the oxidation treatment is too strong, metals that can be easily oxidized such as Fe may interact with oxygen too strongly, thereby metal oxides are possibly produced.

Consequently, it is important to control the oxidation condition of the alloy particles. For controlling the oxidation condition of the alloy particles, an optimum oxidation condition is required.

For example, when alloy particles are produced by the above-mentioned liquid phase method, the oxidation treatment may include supplying gas which contains at least oxygen to the produced alloy particle containing solution.

The partial pressure of oxygen in this case is preferably 10 to 100% of the total pressure and more preferably to 15 to 50% of the total pressure.

The oxidation treatment temperature is preferably 0 to 100° C., and more preferably 15 to 80° C.

It is preferable that the oxidization conditions of the alloy particles are evaluated by EXAFS or the like, and the number of bonds between a base metal such as Fe and oxygen is preferably 0.5 to 4, and more preferably 1 to 3 from the viewpoint of cutting Fe—Fe bonds and Pt—Fe bonds by oxygen.

<Annealing Treatment Process>

The alloy particles that have been subjected to an oxidation treatment have a disordered phase. As described above, a disordered phase cannot provide ferromagnetism. Therefore, an ordered phase must be obtained by applying a heat treatment (annealing). The heat treatment must be done at a temperatures not lower than the transformation temperature at which the alloy composing the alloy particles transforms from disordered phase to ordered phase. The transformation temperature can be determined by differential thermal analysis (DTA).

The transformation temperature is usually around 500° C.; however, it may drop by the presence of a ternary element. Hence, the annealing treatment temperature is preferably not less than 150° C., and more preferably 150 to 500° C.

When an annealing treatment is applied in the particle conditions, the particles easily migrate and fuse. Even in this case, high coercive force can be obtained; however, unfavorably, the particle size tends to increase. Hence, an annealing treatment is preferably done after the alloy particles are coated on a nonmagnetic substrate, from the viewpoint of preventing the aggregation of the alloy particles.

In addition, by annealing the alloy particles, which are coated on a nonmagnetic substrate, a layer comprising the alloy particles is converted to a magnetic layer.

The annealing treatment is conducted preferably in nonoxidizing atmosphere such as $H_2$, $N_2$, Ar, He, or Ne, in order to carry out the phase transformation efficiently and to prevent the oxidation of the alloy.

In particular, from the viewpoint of eliminating the oxygen introduced into the lattices by the oxidation treatment, it is preferable to use reducing atmosphere such as methane, ethane, or $H_2$. Furthermore, from the viewpoint of keeping the particle diameter, it is preferable to perform the annealing treatment in magnetic field in reducing atmosphere. In the case of using $H_2$ atmosphere, it is preferable to add an inert gas from the viewpoint of preventing explosion.

In order to prevent the fusion of the particles at the time of annealing, it is preferable that an annealing treatment is once applied in inert gas at a temperatures not higher than the transformation temperature, and after the dispersant is carbonized, another annealing treatment is applied in a reducing atmosphere at a temperatures not lower than the transformation temperature. In this case, most preferably, after the annealing treatment at a temperatures not higher than the transformation temperature, Si-type resin or the like is applied on the layer comprising the alloy particles in accordance with the necessity, then the other annealing treatment is applied at a temperatures not lower than the transformation temperature.

Applying the above-mentioned annealing treatments enables the alloy particles to transform from the disordered phase to the ordered phase, thereby providing magnetic particles having ferromagnetism.

In the case where magnetic particles are produced by annealing the alloy particles in free particle states, instead of annealing the alloy particles coated on a nonmagnetic substrate, the magnetic particles are kneaded by an open kneader, 3 roll mill, or the like, and then finely dispersed with a sand grinder so as to prepare a coating solution. Then the solution can be applied on the nonmagnetic substrate by a known method so as to form a magnetic layer.

The thickness of the magnetic layer formed is preferably 4 nm to 1 μm, and more preferably 4 to 100 nm, although it depends on the type of the magnetic recording medium.

<Nonmagnetic Substrate>

Both organic nonmagnetic substrates and inorganic nonmagnetic substrates can be used according to the invention, as long as the nonmagnetic substrates can be used in magnetic recording media.

The inorganic nonmagnetic substrates can be made of Al, Al—Mg, an Mg alloy such as Mg—Al—Zn, glass, quartz, carbon, silicon, or ceramics. The substrates made of these materials have excellent shock resistance, and rigidity suitable for thinning of supports or high-speed rotation. In addition, the inorganic substrates made of these materials are more resistant to heat than organic substrates.

The organic nonmagnetic substrates can be made of polyesters such as polyethylene terephthalates and polyethylene naphthalates; polyolefins; cellulose triacetates; polycarbonates, polyamides (including aliphatic polyamides and aromatic polyamides such as aramid), polyimides, polyamideimides, polysulfones, polybenzoxazoles; and the like.

Regarding coating of the alloy particles on the nonmagnetic substrate, various additives, in accordance with the necessity, are added to the alloy particle containing solution which has been subjected to the oxidation treatment, then the alloy particle containing solution is coated on the nonmagnetic substrate.

The content of the alloy particles is preferably a desired concentration (in a range of 0.01 to 0.1 mg/ml).

Methods for coating the alloy particle containing solution on the nonmagnetic substrate include air doctor coating, blade coating, rod coating, extrusion coating, air knife coating, squeeze coating, dip coating, reverse roll coating, transfer roll coating, gravure coating, kiss coating, cast coating, spray coating, and spin coating.

The magnetic particles produced by the aforementioned methods preferably have a coercive force of 95.5 to 398 kA/m (1200 to 5000 Oe), and more preferably 95.5 to 278.6 kA/m (1200 to 3500 Oe), considering adaptability of a recording head.

The diameter of the magnetic particles is preferably 1 to 100 nm, more preferably 3 to 20 nm, and further preferably 3 to 10 nm.

The magnetic recording medium of the invention can include another layer, if necessary, in addition to the magnetic layer. For example, in the case of a disk, it is preferable to provide another magnetic layer or a nonmagnetic layer on the side opposite to the magnetic layer. In the case of a tape, it is preferable to provide a back layer on the surface of the substrate on the side opposite to the magnetic layer.

The wear resistance of the magnetic layer can be improved by providing an extremely thin protection film on the magnetic layer, and sliding properties can be improved by further coating a lubricant on the protection film. Thereby, a magnetic recording medium with sufficient reliability can be obtained.

Examples of the material of the protection film include oxides such as silica, alumina, titania, zirconia, cobalt oxide, and nickel oxide; nitrides such as titanium nitride, silicon nitride, and boron nitride; carbides such as silicon carbide, chromium carbide and boron carbide; and carbons such as graphite and amorphous carbons. Above all, hard amorphous carbons which are generally called diamond-like carbons are particularly preferable.

The carbon protection film made of carbon is suitable to use as the material of the protection film because the carbon protection film has sufficient wear resistance even with minute thickness of the film, and does not cause scorch of a sliding member.

As a method for forming the carbon protection film, spattering is common in the case of a hard disk; however, various methods employing plasma CVD, which enable higher film-forming speed, have been proposed for the products which require continuous film formation such as video tapes. Therefore, these methods can be preferably adopted.

Among them, it is reported that a plasma injection CVD (PI-CVD) process has an extremely high film-forming speed, and provides excellent carbon protection films which are hard and have few pinholes (e.g. JP-A Nos. 61-130487, 63-279426, and 3-113824).

The carbon protection film has a Vickers hardness of preferably 1000 Kg/mm$^2$ or more, and more preferably 2000 Kg/mm$^2$ or more. And its crystalline structure is preferably amorphous and nonconductive.

In the case where a diamond-like carbon film is used as the carbon protection film, this structure can be confirmed by Raman light scattering. When the diamond-like carbon film is measured, the structure can be confirmed by detecting the peak at 1520 to 1560 cm$^{-1}$. When the structure of the carbon film deviates from the diamond-like structure, the peak detected by Raman light scattering deviates from the aforementioned range, and the hardness of the protection film also decreases.

The carbon source material for the formation of the carbon protection film is preferably selected from carbon-containing compounds, such as alkanes such as methane, ethane, propane, and butane; alkenes such as ethylene and propylene; and alkynes such as acetylene. It is also possible to add carrier gas such as argon, or additive gas such as hydrogen or nitrogen for improving film quality in accordance with the necessity.

If the carbon protection film is thick, electromagnetic conversion characteristics deteriorate or contact characteristics with the magnetic layer deteriorate, whereas if the film is thin, wear resistance becomes insufficient. Therefore, the film thickness is preferably 2.5 to 20 nm, and more preferably 5 to 10 nm.

On the other hand, for improving the contact characteristics of the protective film with the magnetic layer which works as the base material of the protection film, it is preferable to modify the surface of the magnetic layer by etching the surface of the magnetic layer with an inert gas in advance, or by exposing the surface of the magnetic layer to a reactive gas plasma such as oxygen.

In order to improve electromagnetic conversion characteristics, magnetic layers having a multi-layered structure can be used, and a known nonmagnetic underlying layer or intermediate layer can be provided under the magnetic layer. In order to improve running endurance or rust resistance, it is preferable to provide a lubricant or a rust inhibitor on the magnetic layer or on the protection film as described above. The lubricant to be added can be a known hydrocarbon-type lubricant, a fluorine-type lubricant, an extreme pressure agent, or the like.

Examples of the hydrocarbon-type lubricant include carboxylic acids such as stearic acid and oleic acid; esters such as butyl stearate; sulfonic acids such as octadecyl sulfonate; phosphoric acid esters such as monooctadecyl phosphate; alcohols such as stearyl alcohol and oleyl alcohol; carboxylic acid amides such as stearic acid amide; and amines such as stearylamine.

The fluorine-type lubricant can be a lubricant in which some or all of the alkyl group or alkyl groups in the aforementioned hydrocarbon-type lubricant are substituted by fluoroalkyl groups or perfluoropolyether groups.

Examples of the perfluoropolyether group include perfluoromethylene oxide polymers, perfluoroethylene oxide polymers, perfluoro-n-propylene oxide polymers $(CF_2CF_2CF_2O)_n$, perfluoroisopropylene oxide polymers $(CF(CF_3)CF_2O)_n$, and copolymers thereof.

Hydrocarbon-type lubricant having a polar functional group such as a hydroxyl group, an ester group, or a carboxyl group at the end of the alkyl group or in a molecule thereof is preferable because of their strong effects on reducing frictional force.

The molecular weight of the lubricant is 500 to 5000, and preferably 1000 to 3000. When it is less than 500, volatility tends to be high and lubrication property tends to be low. On the other hand, when the molecular weight is over 500, the viscosity becomes high so that the slider and the disk are likely to adhere to each other, thereby causing the running to stop or a head crush.

Perfluoropolyethers are commercially available as FOMBLIN from Ausimont, KRYTOX from DuPont K. K., and others.

Examples of the extreme pressure agent include phosphoric acid esters such as trilauryl phosphate; phosphorous acid esters such as trilauryl phosphite; thiophosphorous acid esters such as trilauryl trithiophosphite; thiophosphoric acid esters; and sulfur-type extreme-pressure agents such as dibenzyl disulfide.

The lubricants can be used singly or in combination. In order to provide the lubricant on the magnetic layer or the protection film, the lubricant is dissolved in an organic solvent and applied by employing wire bar method, gravure method, spin coating method, dip coating method, or the like. Or the lubricant is adhered to the magnetic layer or the protection film by vacuum evaporation method.

Examples of the rust inhibitor include nitrogen-containing heterocycles such as benztriazol, benzimidazole, purines, and pyrimidines, and derivatives obtained by introducing an alkyl side chain or the like to the mother nucleus of the nitrogen-containing heterocycles; heterocycles containing both nitrogen and sulfur such as benzthiazole, 2-mercaptobenzthiazole, tetraazaindene ring compounds, and thiouracil compounds, and derivatives of the heterocycles.

As described above, in the case where the magnetic recording medium is a magnetic tape or the like, a back coat layer (backing layer) can be provided on the side of the nonmagnetic substrate that does not have the magnetic layer. The back coat layer is formed by applying a back coat layer-forming paint in which particle components such as an abrasive or an anti-static agent, and a binder are dispersed in a known organic solvent. The conductive layer of the invention can also be used as the back coat layer. The particle components can be selected from various kinds of inorganic pigments and carbon blacks, and as the binder, resins such as nitrocellulose, phenoxy resins, vinyl chloride resins, and polyurethanes can be used solely or in combination. In addition, a known adhesive layer can be provided on at least one of the surface on which the alloy particle containing solution will be applied and the surface on which the back coat layer will be formed.

The magnetic recording medium thus produced should have a surface having a center line average roughness of preferably 0.1 to 5 nm, and more preferably 1 to 4 nm when the cut-off value is 0.25 mm. This is because a surface with extremely excellent smoothness is preferable as the magnetic recording medium for high-density recording.

A method for obtaining such a surface is to apply calendar treatment after the formation of the magnetic layer. It is also possible to conduct a varnish treatment.

The magnetic recording medium obtained can be used by being punched by a punch or cut into a desired size by a cutter.

EXAMPLES

The present invention will be described in detail through the following examples; however, the invention is not limited to these examples.

Example 1

(Preparation of FePt Alloy Particles)

The following operations were performed in highly pure $N_2$ gas.

A reverse micelle solution (I) was prepared by adding an alkane solution containing 10.8 g of Aerosol OT (manufactured by Wako Pure Chemical Industries, Ltd.), 80 ml of decane (manufactured by Wako Pure Chemical Industries, Ltd.), and 2 ml of oleylamine (manufactured by Tokyo Kasei Kogyo Co., Ltd.) to an aqueous solution of a reducing agent in which 0.76 g of $NaBH_4$ (manufactured by Wako Pure Chemical Industries, Ltd.) was dissolved in 16 ml of water (deoxidized: not more than 0.1 mg/liter).

Another reverse micelle solution (II) was prepared by adding an alkane solution containing 5.4 g of Aerosol OT and 40 ml of decane to an aqueous solution of metal salt in which 0.46 g of triammonium ferric trioxalate ($Fe(NH_4)_3(C_2O_4)_3$) (manufactured by Wako Pure Chemical Industries, Ltd.) and 0.38 g of potassium chloroplatinate ($K_2PtCl_4$) (manufactured by Wako Pure Chemical Industries, Ltd.) were dissolved in 12 ml of water (deoxidized).

While the reverse micelle solution (I) was being stirred at high speed in an Omnimixer (manufactured by Yamato Scientific Co., Ltd.) at 22° C., the reverse micelle solution (II) was added instantaneously. Ten minutes later, the mixture solution was heated to 50° C. while being stirred with a magnetic stirrer and aged for 60 minutes.

After 2 ml of oleic acid (manufactured by Wako Pure Chemical Industries, Ltd.) was added, the solution was cooled to room temperature. The cooled solution was taken out in the air. In order to break the reverse micelle, a mixture solution containing 100 ml of water and 100 ml of methanol was added to separate the water phase from the oil phase. The alloy particles were dispersed in the oil phase. The oil phase was cleaned five times by using a mixture solution containing 600 ml of water and 200 ml of methanol each time.

Later, 1100 ml of methanol was added thereto and caused the alloy particles to flocculate and sediment. The supernatant was removed, 20 ml of heptane (manufactured by Wako Pure Chemical Industries, Ltd.) was added, and the alloy particles were dispersed again.

The series of the sedimentation by addition of 100 ml of methanol and the dispersion by addition of 20 ml of heptane, were repeated twice. Finally, 5 ml of heptane was added to prepare an alloy particle containing solution which contained FePt alloy particles having a mass ratio between the water and the surfactant (water/surfactant) of 2.

The yield, composition, volume average particle diameter, and distribution (coefficient of variation) of the obtained alloy particles were measured, and the following results were obtained.

The composition and yield were measured by ICP spectroscopy analysis (inductively coupled high frequency plasma spectroscopy analysis).

The volume average particle diameter and distribution were determined by measuring the particles photographed with a TEM (a transmittance electron microscope: Hitachi, Ltd. 300 kV) and statistically processing the obtained data.

The alloy particles for measurement were prepared by collecting alloy particles from the prepared alloy particle containing solution, sufficiently drying the collected alloy particles, and heating the dried alloy particles in an electric furnace.

composition: an FePt alloy including 44.5 at % of Pt, yield: 85%, average particle diameter: 4.2 nm, coefficient of variation: 5%

(Oxidation Treatment)

Vacuum degassing was performed to condense the prepared alloy particle containing solution to such a degree that the amount of the alloy particles in the solution became 4% by mass. After the condensation, oxygen gas was supplied to the alloy particle containing solution in order to oxidize the alloy particles under atmospheric pressure. The solvent vapored away at the time of oxidation treatment was made up by adding heptane. 0.04 ml of oleylamine per 1 ml of the alloy particle containing solution was added to the solution after the oxidation treatment.

Preparation of $SnO_2$ Dispersion a) Preparation of $SnO_2$ Powder

A homogeneous solution was formed by dissolving 65 parts by mass of stannic chloride hydrate and 1.5 parts by mass of antimony trichloride in 1000 parts by mass of ethanol. Drops of a 1 mol/l aqueous solution of sodium hydroxide were added to the solution until the pH of the solution became 3 so as to obtain colloid-like coprecipitation of stannic oxide and antimony oxide. The obtained coprecipitation was left for 24 hours at 50° C. so as to obtain reddish-brown colloid-like precipitation, which was then separated by centrifugal separation.

In order to remove excessive ions, water was added to the precipitation and the precipitation was washed with water by centrifugal separation. This operation was repeated three times to remove excessive ions. 100 parts by mass of the colloid-like precipitation from which the excessive ions had been removed was mixed with 50 parts by mass of barium sulfate having an average particle diameter of 0.3 μm and 1000 parts by mass of water. And the mixture was sprayed in a firing furnace heated to 900° C. so as to obtain a mixture in a state of bluish powder which has an average particle diameter of 0.1 μm and is composed of stannic oxide and barium sulfate. Then, 1 g of this mixture was put in an insulating cylinder having an inner diameter of 1.6 cm, and the volume resistivity of the powder was measured while the powder was pressurized in the vertical direction with a pressure of 1000 kg/cm$^2$ by using stainless electrodes. The obtained result was 11 Ωcm.

b) Preparation of $SnO_2$ Dispersion (1) 10 parts by mass of the $SnO_2$ power obtained in a)
(2) 150 parts by mass of water
(3) 1 part by mass of a 30% aqueous solution of ammonia The mixture composed of (1)–(3) was dispersed for one hour by using a paint shaker so as to obtain a homogeneous dispersion. This dispersion was subjected to centrifugal separation for 30 minutes at 2000 rpm to remove large particles. The supernatant liquid was subjected to centrifugal separation for one hour at 3000 rpm to obtain $SnO_2$ paste composed of fine particles.

The following conductive layer was applied on the surfaces shown in Table 1 of the Si substrate (nonmagnetic substrate) in a manner such that the coated amount became the amount shown in Table 1 by using a spin coater, and dried for one minute at 155° C.

(Conductive Layer)

| | |
|---|---|
| gelatin | 80 mg/m$^2$ |
| polyethyl acrylate | 20 mg/m$^2$ |
| conductive member (the aforementioned $SnO_2$ dispersion) | |
| | the amount of coating shown in Table 1 |

(Annealing Treatment)

The alloy particle containing solution which had been subjected to the oxidation treatment was applied on the Si substrate and the Si substrate coated with the conductive layer by using the spin coater. The coated amount was such an amount that the coated amount of the alloy particles became 0.5 g/m$^2$. After the coating, the Si substrate was heated in an electric furnace (550° C.) in an $H_2$ gas atmosphere for 30 minutes at a temperature rising rate of 50° C./min, cooled to room temperature at 50° C./min, and subjected to an annealing treatment. As a result, a magnetic layer (thickness: 50 nm) containing magnetic particles was formed. In this way, the magnetic recording medium of Example 1 was produced.

Example 2

The magnetic recording medium of Example 2 was prepared in the same manner as in Example 1 except that the conductive layer was applied also on the opposite side of the magnetic layer by using a spin coater so that the coated amount became the amount shown in Table 1, and dried for one minute at 155° C.

Example 3

The magnetic recording medium of Example 3 was prepared in the same manner as in Example 2 except that no conductive layer was formed between the substrate and the magnetic layer.

Example 4

The magnetic recording medium of Example 4 was prepared in the same manner as in Example 3 except that the conductive layer on the opposite side of the magnetic layer was replaced by the conductive layer shown below.

(Conductive Layer)

| | |
|---|---|
| gelatin | 80 mg/m² |
| compound A shown below (conductive polymer compound) | the amount of coating shown in Table 1 |

Compound A

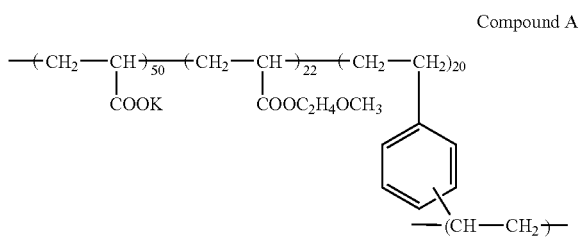

Example 5

The magnetic recording medium of Example 5 was prepared in the same manner as in Example 4 except that the conductive layer recited in Example 1 was formed between the magnetic layer and the substrate.

Example 6

The magnetic recording medium of Example 6 was prepared in the same manner as in Example 2 except that the magnetic layer was formed on both sides of the support.

The magnetic recording media of Examples 1 through 6 and Comparative Example 1 were evaluated in the following way.

Magnetic properties (measurement of coercive force) were tested by using a high-sensitivity magnetization vector measuring device and a DATA processor both manufactured by Toei Industry Co., Ltd. with an applied magnetic field of 790 kA/m (10 kOe).

Easiness of adhesion of dusts was determined by an ash adhesion test (the magnetic recording medium were brought closely to cigarette ash to see how much of ash adhered to the magnetic recording medium).

TABLE 1

| | Position and coated amount of conductive layer | | | | | Particle | Surface |
|---|---|---|---|---|---|---|---|
| | Between magnetic layer and substrate | On the side opposite to magnetic layer | Magnetic layer | Adhesion of ash | Hc (kA/m) | diameter (nm) | electric resistance (Ω/sq) |
| Example 1 | SnO₂ (160 mg/m²) | Not provided | One side | Little | 310.5 (3900 Oe) | 5 | 10⁹ |
| Example 2 | SnO₂ (160 mg/m²) | SnO₂ (160 mg/m²) | One side | None | 314.5 (3950 Oe) | 5 | 10⁶ |
| Example 3 | Not provided | SnO₂ (160 mg/m²) | One side | None | 322.5 (4050 Oe) | 5 | 10⁷ |
| Example 4 | Not provided | Compound A (80 mg/m²) | One side | None | 318.5 (4000 Oe) | 5 | 10⁸ |
| Example 5 | SnO₂ (160 mg/m²) | Compound A (80 mg/m²) | One side | None | 310.5 (3900 Oe) | 5 | 10⁶ |
| Example 6 | SnO₂ (160 mg/m²) | SnO₂ (160 mg/m²) | Both sides | None | 314.5 (3950 Oe) | 5 | 10⁶ |
| Comparative Example 1 | Not provided | Not provided | One side | Much | 318.5 (4000 Oe) | 5 | 10¹¹ |

Table 1 reveals that the magnetic recording media of Examples 1 through 6, each of which has a conductive layer on at least one side of the nonmagnetic substrate, were dust-resistant.

As described above, according to the invention, dust-resistant magnetic recording medium can be provided.

What is claimed is:

1. A magnetic recording medium comprising a magnetic layer on at least one side of an inorganic nonmagnetic substrate, the magnetic layer containing magnetic particles of a CuAu-type or $Cu_3Au$-type ferromagnetic ordered phase produced by a liquid phase method, wherein a conductive layer containing polyvinylbenzene sulfonate, polyvinyl benzyl trimethyl animonium chloride, or a quaternary salt polymer is provided on at least one side of the inorganic nonmagnetic substrate, the conductive layer having a thickness of 10 to 400 nm.

2. The magnetic recording medium according to claim 1, wherein the thickness of the conductive layer is 20 to 400 nm.

3. A magnetic recording medium comprising a magnetic layer on at least one side of an inorganic nonmagnetic substrate, the magnetic layer containing magnetic particles of a CuAu-type or $Cu_3Au$-type ferromagnetic ordered phase produced by a liquid phase method, wherein a conductive layer containing a conductive metal oxide is provided on at least one side of the inorganic nonmagnetic substrate, the conductive layer having a thickness of 10 to 400 nm.

4. The magnetic recording medium according to claim 1, wherein the conductive layer is disposed between the inorganic nonmagnetic substrate and the magnetic layer.

5. The magnetic recording medium according to claim 1, wherein the conductive layer is disposed on the inorganic nonmagnetic substrate on a side opposite to the magnetic layer.

6. The magnetic recording medium according to claim 1, wherein the conductive layer is disposed on an edge of the inorganic nonmagnetic substrate.

7. The magnetic recording medium according to claim 3, wherein the conductive metal oxide is selected from ZnO $Al_2O_3$, $In_2O_3$, $SiO_2$, MgO, BaO, $MoO_3$, $V_2O_5$ and complex oxides thereof.

8. The magnetic recording medium according to claim 3, wherein the conductive metal oxide has a volume resistivity of not more than $10^7$ Ωcm.

9. The magnetic recording medium according to claim 1, wherein the magnetic recording medium has a surface electric resistance of not more than $10^{10}$ Ω/sq.

10. The magnetic recording medium according to claim 1 further comprising another magnetic layer, a nonmagnetic layer, or a back layer on a side opposite to the magnetic layer.

11. The magnetic recording medium according to claim 1 further comprising a protection film on the magnetic layer.

12. The magnetic recording medium according to claim 3, wherein the conductive layer is disposed on an edge of the inorganic nonmagnetic substrate.

13. The magnetic recording medium according to claim 1, wherein the CuAu-type or $Cu_3Au$-type ferromagnetic ordered phase produced by a liquid phase method is selected from FeNi, FePd, FePt, CoPt, CoAu, $Ni_3Fe$, $FePd_3$, $Fe_3Pt$, $FePt_3$, $CoPt_3$, $Ni_3Pt$, $CrPt_3$ and $Ni_3Mn$.

14. The magnetic recording medium according to claim 3, wherein the CuAu-type or $Cu_3Au$-type ferromagnetic ordered phase produced by a liquid phase method is selected from FeNi, FePd, FePt, CoPt, CoAu, $Ni_3Fe$, $FePd_3$, $Fe_3Pt$, $FePt_3$, $CoPt_3$, $Ni_3Pt$, $CrPt_3$ and $Ni_3Mn$.

15. The magnetic recording medium according to claim 7, wherein the CuAu-type or $Cu_3Au$-type ferromagnetic ordered phase produced by a liquid phase method is selected from FeNi, FePd, FePt, CoPt, CoAu, $Ni_3Fe$, $FePd_3$, $Fe_3Pt$, $FePt_3$, $CoPt_3$, $Ni_3Pt$, $CrPt_3$ and $Ni_3Mn$.

* * * * *

UNITED STATES PATENT AND TRADEMARK OFFICE
CERTIFICATE OF CORRECTION

PATENT NO.         : 7,108,927 B2  
APPLICATION NO. : 10/694839  
DATED              : September 19, 2006  
INVENTOR(S)       : Yasushi Hattori and Koukichi Waki Page 1 of 1

It is certified that error appears in the above-identified patent and that said Letters Patent is hereby corrected as shown below:

Title Page  
Please insert

--(30)   Foreign Application Priority Data

Oct. 30, 2002    (JP)    ................................... 2002-315649--

Signed and Sealed this

Twenty-first Day of August, 2007

JON W. DUDAS  
*Director of the United States Patent and Trademark Office*